Aug. 19, 1958     H. J. TALGE ET AL     2,848,028
FOOD HOLDING ARRANGEMENT FOR FOOD SLICERS
Filed Dec. 30, 1957

INVENTORS.
Henry J. Talge
Frank E. Aberer
BY
ATTORNEY.

United States Patent Office 2,848,028
Patented Aug. 19, 1958

2,848,028

FOOD HOLDING ARRANGEMENT FOR FOOD SLICERS

Henry J. Talge, Kansas City, Mo., and Frank E. Aberer, Kansas City, Kans.; said Aberer assignor to said Talge Application December 30, 1957, Serial No. 705,999

1 Claim. (Cl. 146—102)

This invention relates to food slicing machines and refers more particularly to an improved food holding arrangement for machines of the type operable, upon reciprocation of a food-carrying carriage in relation to a cutting blade, to reduce bulk food items to a plurality of slices of gauged thickness.

Food slicing mechanisms of the type generally described above are known. While usually satisfactory in operation, still certain dangers to the operator yet remain. One of the most prevalent of these is the inadequate protection afforded for the hand of the operator as the food is being fed toward and through the blade, particularly as the end of the food body is reached.

In slicing machines of which we are aware the custom in the past has been to provide a feed plate which is disposed at the opposite side of the carriage from the blade and which can be pressed against the food body to maintain it in firm contact with the thickness guide plate as the carriage is reciprocated for cutting. Theoretically, the operator can place his fingers behind this feed plate and thus avoid contact with the blade as the last slices are being cut. However, it is known that in many instances it is necessary to also apply a downward force on the food body to hold it in proper position for cutting, in which case it becomes necessary that the operator place one or more fingers on top of the food body. As the food body is shortened, or as it becomes required for the operator to place his fingers in close proximity to the blade, obviously the danger increases.

One of the important objects of the present invention is to provide a food body holding arrangement in which a food body engaging element is operable to hold the food body down firmly in contact with the carriage while still providing protection for the hand and fingers of the operator.

Another object of the invention is to provide a slicer having a hold-down device which enables the successful slicing of much longer and larger bodies of food, such as long roasts and hams, than can be handled in presently known machines. In our invention the feed plate previously mentioned is eliminated, its function being taken over in more efficient fashion by the hold-down device.

A further object of the invention is to provide a slicer having a hold-down device which is usable with the largest to the smallest of foods.

Still another object of the invention is to provide a device of the character described which renders the slicing more positive and accurate and which can be adjusted as desired toward or away from the end being sliced so as to select the optimum point for applying pressure to insure that the food body is fed properly through the slicing blade.

A further object of the invention is to provide a protective holder and feed device which can be placed on and used with many slicing machines already on the market and in the homes of consumers and with the results and advantages set forth above.

Still another object of the invention is to provide a protective holder and feed device of the character described which is economical to manufacture, simple to assemble and which will operate with ease and facility over a long period of years.

Other and further objects of the invention together with the features of novelty appurtenant thereto will appear in the course of the following description.

In the accompanying drawing which forms a part of the specification and is to be read in conjunction therewith, and in which like reference numerals indicate like parts in the various views.

Figure 1:
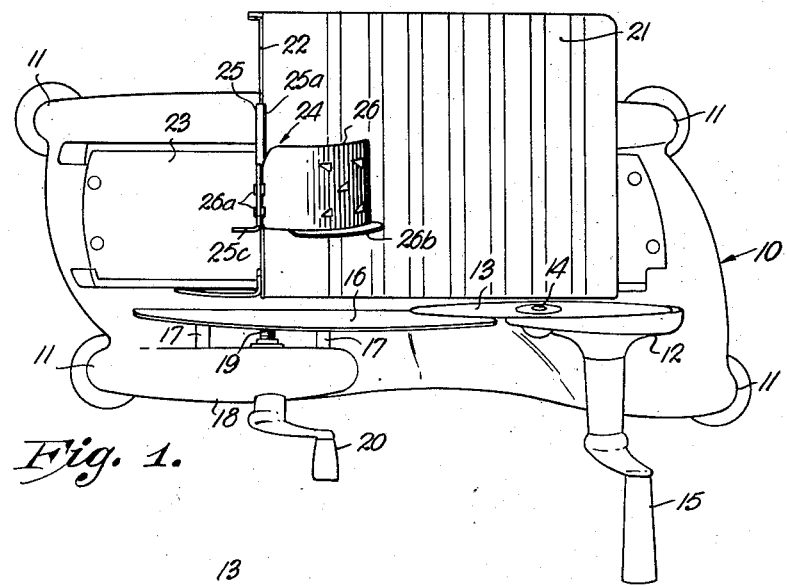
Fig. 1 is a top plan view of a typical food slicing machine embodying our invention.
Figure 2:
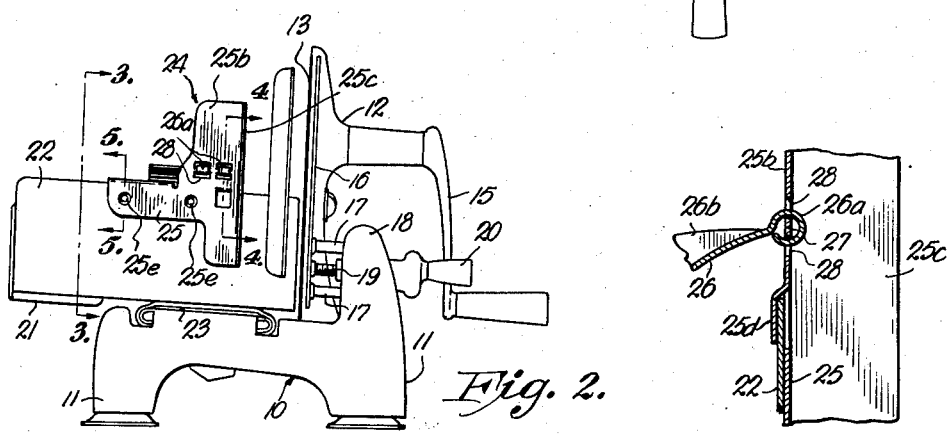
Fig. 2 is an end elevation from the left hand end of Fig. 1.
Figure 3:
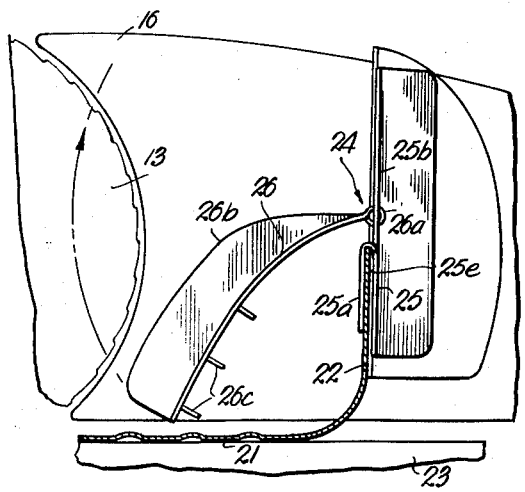
Fig. 3 is an enlarged fragmentary section taken along the line 3—3 of Fig. 2 in the direction of the arrows.

Referring to the drawings and initially to Figs. 1, 2 and 3, the general arrangement of the meat slicing device shown therein is known to the art. This device includes a base 10 supported by the four legs 11. On the base there is mounted a stationary support and housing 12 which carries a sharp edged vertically disposed circular slicing blade 13. Blade 13 is supported for rotation about an axis 14, being operable through the medium of a hand crank 15.

Supported in parallelism with the blade and to one side thereof is an upstanding plate-like member 16 known as the thickness guide. In the typical machine here illustrated this guide is adjustably supported by pins 17 from a standard 18 extending upwardly from and supported on the base. A screw 19 is threaded through standard 18 and swiveled to the guide plate 16. By turning this screw through the medium of hand crank 20 the position of the guide axially of the blade can be varied and the thickness of the cut thus controlled.

Supported on the base adjacent the guide 16 is the usual food platform or carriage 21 which is movable in directions transverse to the axis of the blade 13 so as to advance food toward the blade parallel to guide 16 to form a cut and to withdraw the food to prepare it for another cut. The carriage has at its rear or trailing edge an upstanding vertical flange 22 disposed normal to the path of travel of the carriage and preferably extending across the width of the carriage. Any suitable track mechanism such as indicated at 23 may be utilized to support the carriage for reciprocation in the fashion described.

The elements described thus far are conventional. In the ordinary operation of a unit of the type described, the food body, for example a roast, is placed on the carriage 21 and butted against the thickness guide 16. The carriage is then moved toward the blade (in Fig. 1 the carriage is shown in the position it would occupy about the middle of the cut of a large roast) to bring the food body into contact with the blade; as the blade is rotated and the carriage further advanced a slice is separated. During the cutting operation it is necessary to maintain pressure on the food body, pressing it toward the guide 16 and the plane of the blade in order to keep the food feeding accurately through the blade.

Figure 5:
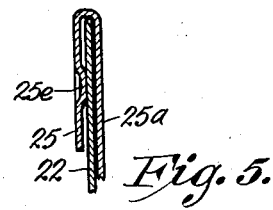
Fig. 5 is an enlarged fragmentary section taken along the line 5—5 of Fig. 2 in the direction of the arrows.

The hold-down and feed device of our invention is indicated generally at 24. Basically it comprises two elements, namely a slide element 25 and a food body contacting or engaging element 26. The slide 25 is preferably formed of sheet metal. At its outer end it has a reversely bent portion 25a which forms a U-shaped channel. This permits the slide to be placed upon the flange 22 of the carriage so that it is freely slidable longitudinally of the flange. In order to obtain a moderate spring gripping force on the flange which will prevent the slide element from being sprung too easily therefrom, dimples or depressions 25e are formed in the outside leg of the slide as indicated in Figs. 2 and 5. The normal spacing (when the slide is freed from the machine) between the confronting faces of the dimples 25e and portion 25a is slightly less than the thickness of the flange 22 so that when the slide is mounted thereon a frictional pressure will be exerted by the dimples.

Figure 4:
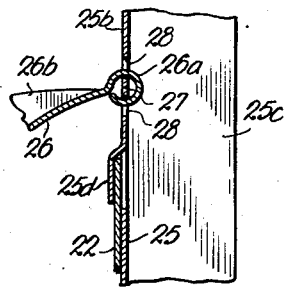
Fig. 4 is an enlarged fragmentary section taken along the line 4—4 of Fig. 2 in the direction of the arrows.

That portion of the slide closest to the blade, instead of being turned downwardly to form a channel, extends upwardly in the form of an extension 25b. This extension has at its innermost edge an outturned flange 25c which forms a thumb guard for the operator. It will be noted that a punched-out ear 25d is provided in extension 25b (see Fig. 4), this ear being spaced from the plane of the extension in order that it lies on the opposite side of the carriage flange 22 as shown to provide an additional point of connection of the slide with the carriage flange.

As previously mentioned the food body engaging element is indicated at 26. Preferably this comprises a downwardly concave element, which may also be formed of sheet metal. It is swingably connected with the extension 25b of slide 25 by means of a hinge connection detailed in Figs. 2 and 4. This connection includes a pair of hinge eyes 26a formed on the element 26 which are loosely fitted around hinge bars 27 formed by double slots 28 cut out of the extension 25b. It will thus be evident, as is illustrated by the arcuate arrow in Fig. 3, that the food engaging element 26 is swingable up and down relative the carriage 21.

Formed on the inner edge of the element 26 is an upstanding shield or flange 26b whose function is dual. In the usual operation of machines of this type the left hand is utilized to hold the food body while the right hand turns the blade crank 15. Thus it will be normal for the operator to place his left hand on the food contacting body 26. The shield or guard 26b will thus lie between the hand and the blade, affording not only a shield preventing contact of the blade with the hand but also a surface against which lateral pressure can be exerted to press the food body toward the blade. In order to more efficiently hold the element 26 in firm engagement with the food body, prongs or teeth 26c are provided on the underside thereof and these may conveniently be formed by striking them from the sheet of which the element 26 is formed, as illustrated in Fig. 1.

The operation of the device is believed evident from the description that has preceded. The slide element 25 is movable longitudinally of the flange 22 by simply forcing it in the direction desired. To place the food body on the carriage in position for slicing it is necessary only to lift the food-engaging element 26 to its uppermost position and to place the food body thereunder. The element 26 is allowed to drop onto the top of the food body so that it is in contact therewith. The operator then places his hand, as earlier described, on the element 26 and, while maintaining firm pressure thereon and at the same time pushing the device toward the guide plate 16, turns the crank 15 and reciprocates the carriage 21.

One important advantage of the device disclosed herein over the conventional end feed plate previously used is that it places the hand of the operator in much better position for reciprocation of carriage 21 during slicing. In the previous devices the longer the food body, the further out on carriage 21 was the hand of the operator located. This meant that a twisting force was imposed on the carriage as the carriage was reciprocated. However, in the present device the hand of the operator is much closer to the blade during slicing, which means that the pressure on the carriage is better centered.

It will be evident that any size food body can be handled in a slicer equipped with a hold-down and feed device according to our invention. There is no reason why the food body cannot extend well beyond the outermost edge of the carriage 21. This has not been true with slicers equipped with the end plate previously described, and therefore the present invention represents a valuable improvement thereover.

The provision of the thumb shield 25c on the outside of slide 25 in combination with the guard or barrier 26b on the food contacting body 26 means that a substantially straight line force is exerted along the carriage flange 22 as the food body is moved toward guide 16. This is important in that it prevents twisting forces on the flange and makes the movement of the entire food holding device along the flange relatively easy.

It will be evident that the device can easily be removed from the flange 22 for cleaning or should it for any reason become desirable to operate the slicer without the hold-down device in place. The device is removed by merely lifting upwardly which disengages the tongue 25d and the overlying element 25a from the carriage flange. Obviously, reinstallation is a simple matter.

From the foregoing it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

A food body hold-down and feed attachment for food slicers of the type having a blade, a carriage reciprocable edgewise of the blade and having a food platform, and an upstanding flange on the trailing edge of the food platform and disposed normal to the plane of the blade, comprising a slide element in the form of a thin inverted U-shaped member having legs lying on opposite sides of said flange with the bight of the U overlying the upper edge of the flange, said slide element including an upward extension thereon, a vertical flange approximately normal to said first flange secured to said extension on that side of the extension facing away from the food platform and of such extent to provide a guard for the thumb, a downwardly concave sheet-like food engaging element pivotally secured at one end to said extension and extending across and overlying said food platform, said food engaging element having on that edge closest to said blade an upstanding integral shield of substantially equal length with the food engaging element to provide a guard for the fingers, and teeth formed on the concave side of said food engaging element, said teeth being struck from the sheet of which the element is composed and bent approximately normal thereto.

References Cited in the file of this patent

UNITED STATES PATENTS

| | | |
|---|---|---|
| 1,566,064 | Basse | Dec. 15, 1925 |
| 1,825,711 | Campbell | Oct. 6, 1931 |
| 2,560,671 | Van Duyn | July 17, 1951 |

FOREIGN PATENTS

| | | |
|---|---|---|
| 519,292 | Great Britain | Mar. 20, 1940 |

OTHER REFERENCES

"General Slicing Machines," published by General Slicing Machine Co., Inc., Walden, New York, copyright 1954.